United States Patent
Hong (10) Patent No.: US 12,490,231 B2
(45) Date of Patent: Dec. 2, 2025

(54) INFORMATION PROCESSING METHOD, AND COMMUNICATION DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 386 days.

(21) Appl. No.: 17/920,316

(22) PCT Filed: Apr. 22, 2020

(86) PCT No.: PCT/CN2020/086197
§ 371 (c)(1),
(2) Date: Oct. 20, 2022

(87) PCT Pub. No.: WO2021/212380
PCT Pub. Date: Oct. 28, 2021

(65) Prior Publication Data
US 2023/0171733 A1    Jun. 1, 2023

(51) Int. Cl.
*H04W 68/02* (2009.01)
(52) U.S. Cl.
CPC ................. *H04W 68/02* (2013.01)
(58) Field of Classification Search
CPC .................................................. H04W 68/02
USPC ....................................................... 455/458
See application file for complete search history.

(56) References Cited

U.S. PATENT DOCUMENTS

| 2015/0050952 A1* | 2/2015 | Ponukumati ......... H04W 68/02 455/458 |
| 2016/0100442 A1* | 4/2016 | Xu ....................... H04W 68/005 370/329 |
| 2017/0150545 A1 | 5/2017 | Ramkumar et al. |

FOREIGN PATENT DOCUMENTS

| CN | 110677900 A | 1/2020 |
| CN | 111602437 A | 8/2020 |
| TW | I474699 B | 2/2015 |
| WO | WO 2015171275 A1 | 11/2015 |

OTHER PUBLICATIONS

PCT/CN2020/086197 International Search Report dated Jan. 20, 2021; 2 pages.
(Continued)

*Primary Examiner* — Joel Ajayi
(74) *Attorney, Agent, or Firm* — Cozen O'Connor (57) ABSTRACT

An information processing method includes a base station determining a first subscriber identity module (SIM) to be paged of a user equipment (UE), the UE being configured with at least the first SIM and a second SIM, and the base station sending a paging target indication of the UE to a target SIM of the UE, the target SIM being the first SIM or the second SIM, and the paging target indication being configured to indicate paging the first SIM.

7 Claims, 6 Drawing Sheets

(56) References Cited

OTHER PUBLICATIONS

European Patent Application No. 20931893.0, Search and Opinion Jan. 5, 2024, 14 pages.
LG Electronics "Solution MT Service notification for MUSIM UE" 3GPP TSG-SA2, Meeting #136-AH, S2-2000650, Jan. 2020, 4 pages.
LG Electronics "Discussion on the granularity" 3GPP TSG-SA WG Meeting #88, S1-193014, Nov. 2019, 4 pages.
NEC, Samsung "Solution X: Paging delivery for USIM_2 while USIM_1 is in connected mode on the same network" SA WG2 Meeting #136, S2-1911347, Nov. 2019, 3 pages.
Indian Patent Application No. 202247064338, Office Action dated Jan. 5, 2023, 6 pages.

* cited by examiner

INFORMATION PROCESSING METHOD, AND COMMUNICATION DEVICE

CROSS-REFERENCE TO RELATED APPLICATION

This application is the US national phase application of International Application No. PCT/CN2020/086197, filed on Apr. 22, 2020, the entire contents of which are incorporated herein by reference for all purposes.

TECHNICAL FIELD

The disclosure relates to the field of wireless and other communication technologies, and in particular, to information processing methods, apparatuses, communication devices, and storage medium.

BACKGROUND

In related technologies, change of system information (SIB) can be indicated in two ways: one is through a paging signaling; the other is through an indication in SIB1. In 5G, change of the system information is indicated by a short message. In this way, when there is no paging signaling for user equipment (UE), but there is a short message, only corresponding indicator bits in the short message need to be read, saving processing complexity and power of the UE.

With the development of wireless communication technology, there are more and more UEs with multiple Subscriber Identity Modules (SIMs) in the market. At present, the processing methods for the UE with multiple SIMs are mainly based on the implementation of each terminal manufacturer, and no unified standard is specified. This leads to many different user equipment behaviors and processing methods, such as dual card single standby, dual card dual standby single pass, dual card dual standby dual pass, etc. And for the UE with multiple SIMs, the current network considers different SIMs as different UEs. In this way, for paging with multiple SIMs, the network will regard the UE with multiple SIMs as multiple independent UEs for paging. In this way, when paging with multiple SIMs, the connection between the SIM in the UE with multiple SIMs and the base station may time out.

SUMMARY

According to a first aspect of embodiments of the present disclosure, an information processing method is provided. The method is applied to a base station, and includes:
  determining a first Subscriber Identity Module (SIM) of a user equipment (UE) to be paged, wherein the UE is at least configured with the first SIM and a second SIM;
  sending a paging target indication of the UE to a target SIM of the UE, wherein the target SIM is the first SIM or the second SIM, and wherein, the paging target indication is configured to indicate paging the first SIM.

According to a second aspect of the present disclosure, an information processing method is provided. The method is applied to a UE, and includes:
  receiving a paging target indication of the UE through a target SIM, wherein the target SIM is a first SIM or a second SIM, and wherein, the paging target indication is configured to indicate paging the first SIM.

According to a third aspect of present disclosure, a communication device is provided. The communication device includes:
  a processor;
  a memory, configured to store instructions executable by the processor,
  wherein the processor is configured to implement the information processing method described in any embodiment of the present disclosure when running the executable instructions.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in embodiments of the present disclosure are only for the purpose of describing particular embodiments, and are not intended to limit the embodiments of the present disclosure. As used in the embodiments of the present disclosure and the appended claims, the singular forms "a", "the", and "said" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used in embodiments of the present disclosure to describe various pieces of information, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" as used herein can be interpreted as "in case of" or "when" or "in response to determining."

Figure 1:
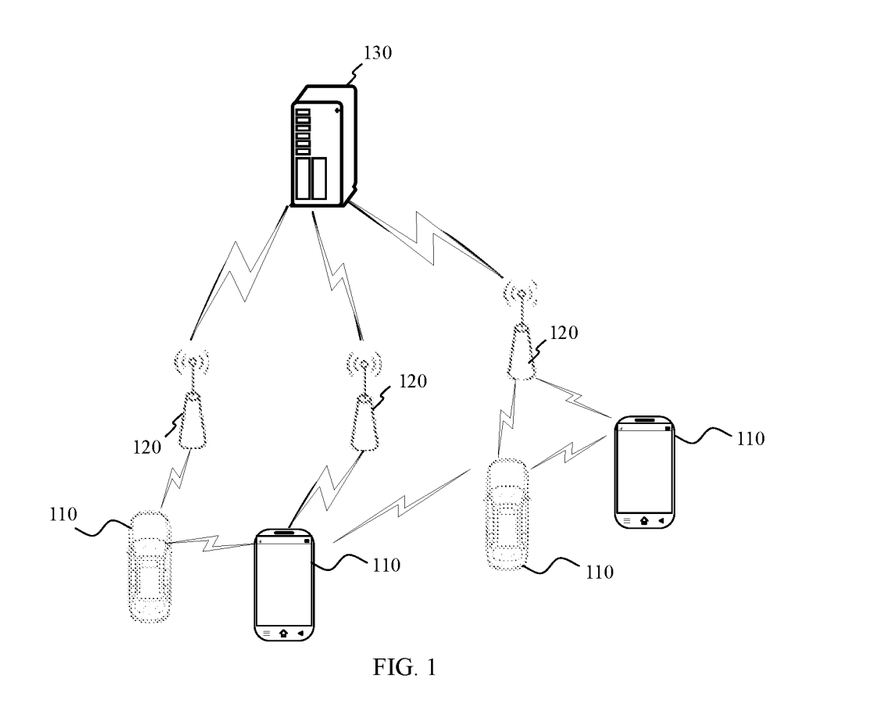
FIG. 1 shows a schematic diagram of a wireless communication system.

Please refer to FIG. 1, which shows a schematic diagram of a wireless communication system provided by an embodiment of the present disclosure. As shown in FIG. 1, the wireless communication system is a communication system based on cellular mobile communication technology, and the wireless communication system may include: several user equipment 110 and several base stations 120.

The user equipment 110 may be a device that provides voice and/or data connectivity to the user. The user equipment 110 may communicate with one or more core networks via a Radio Access Network (RAN), and the user equipment 110 may be an IoT terminal such as a sensor device, a mobile phone (or "cellular" phone) and a computer of the IoT terminal, for example, may be a fixed, portable, pocket, hand-held, computer built-in or a vehicle-mounted device, for example, Station (STA), subscriber unit, subscriber station, mobile station, mobile, remote station, access point, remote terminal, access terminal, user terminal, user agent, user device, or user equipment (UE). Alternatively, the user equipment 110 may also be a device of an unmanned aerial vehicle. Alternatively, the user equipment 110 may also be a vehicle-mounted device, for example, a trip computer with a wireless communication function, or a wireless communication device externally connected to the trip computer. Alternatively, the user equipment 110 may also be a roadside device, for example, a street light, a signal light, or other roadside devices with a wireless communication function.

The base station 120 may be a network-side device in the wireless communication system. The wireless communication system may be the 4th generation mobile communication (4G) system, also known as Long Term Evolution (LTE) system; or, the wireless communication system may also be a 5G system, also known as new radio (NR) system or 5G NR system. Alternatively, the wireless communication system may also be a next-generation system of the 5G system. The access network in the 5G system may be called NG-RAN (New Generation-Radio Access Network).

The base station 120 may be an evolved base station (eNB) used in the 4G system. Alternatively, the base station 120 may also be a base station (gNB) that adopts a centralized-distributed architecture in the 5G system. When the base station 120 adopts the centralized-distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; a physical (PHY) layer protocol stack is provided in the distributed unit, and the specific implementation of the base station 120 is not limited in embodiments of the present disclosure.

A wireless connection can be established between the base station 120 and the user equipment 110 through a radio air interface. In different embodiments, the radio air interface is a radio air interface based on the fourth generation mobile communication network technology (4G) standard; or, the radio air interface is a radio air interface based on the fifth generation mobile communication network technology (5G) standard, such as a new air interface; or, the radio air interface may also be a radio air interface based on a next-generation mobile communication network technology standard of 5G.

In some embodiments, an E2E (End to End) connection may also be established between the user equipment 110, for example, in scenarios such as V2V (vehicle to vehicle) communication, V2I (vehicle to Infrastructure) communication and V2P (vehicle to pedestrian) communication in V2X (vehicle to everything) communication.

Here, the user equipment above may be considered as the terminal device in the following embodiments.

In some embodiments, the above wireless communication system may further include a network management device 130.

Several base stations 120 are respectively connected to the network management device 130. The network management device 130 may be a core network device in the wireless communication system. For example, the network management device 130 may be a mobility management entity (MME) in an evolved packet core (EPC) network. Alternatively, the network management device may also be other core network devices, such as a serving gateway (SGW), a public data network gateway (PGW), a policy and charging rules function (PCRF) or home subscriber server (HSS), etc. The implementation form of the network management device 130 is not limited in embodiments of the present disclosure.

Figure 2:
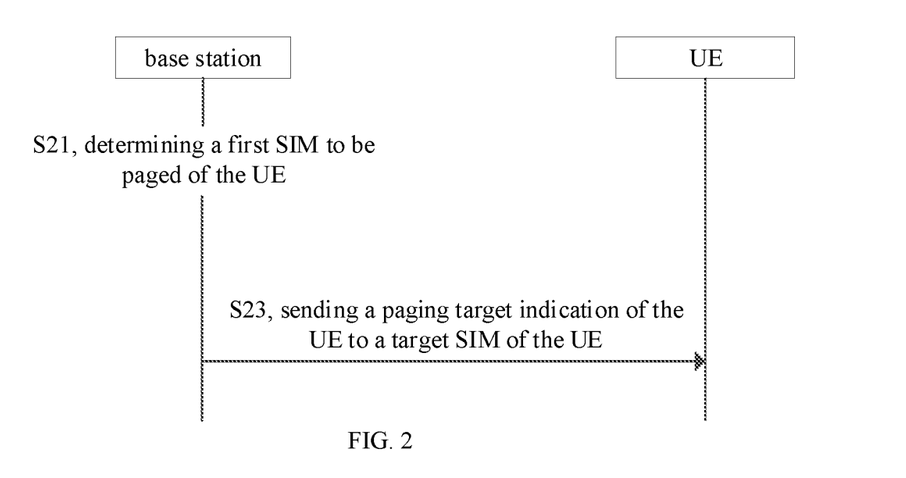
FIG. 2 is a flowchart of an information processing method applied to a base station according to an exemplary embodiment.

As shown in FIG. 2, this embodiment provides an information processing method applied to a base station. The method includes following steps.

In step S21, a first subscriber identity module (SIM) of a user equipment (UE) to be paged is determined.

The UE is at least configured with the first SIM and a second SIM.

In step S23, a paging target indication of the UE is sent to a target SIM of the UE.

The target SIM is the first SIM or the second SIM. The paging target indication is configured to indicate paging the first SIM.

The base station described in embodiments of the present disclosure is an interface device for the user equipment to access the Internet. The base station may be various types of base station, such as a 3G base station, a 4G base station, a 5G base station or other evolving base stations.

The user equipment (UE) described in embodiments of the present disclosure may be a mobile phone, a computer, a server, a transceiver, a tablet device or a medical device, etc.

In an embodiment of the present disclosure, the UE includes the first SIM or the second SIM. The target SIM may be the first SIM or the second SIM. Here, the first SIM is a SIM to be paged; the target SIM is a SIM receiving the paging target indication; the SIM receiving the paging target indication may be the first SIM or the second SIM.

In an application scenario, in response to the target SIM receiving the paging target indication being the first SIM, the paging target indication is configured to indicate paging the first SIM itself. Alternatively, in response to the target SIM receiving the paging target indication is the second SIM, the paging target indication is configured to indicate paging other SIMs, that is, the first SIM.

Here, there may be one or more first SIMs and one or more second SIMS.

In some embodiments, step S23 includes:
sending the paging target indication to the target SIM of the UE through a short message.

Here, the short message carries the paging target indication.

In some embodiments, the target SIM may be a SIM in a radio resource control (RRC) connected state with the base station.

In other embodiments, the target SIM may be a SIM in an RRC idle state or an RRC inactive state. In this embodiment, when receiving the short message, the target SIM is in the RRC connected state; after receiving the short message, the target SIM may be in the RRC idle state or the RRC inactive state at the paging occasion of the target SIM.

Here, the first SIM is a SIM in the RRC idle state, or the first SIM is a SIM in the RRC inactive state, or the first SIM is a SIM in the RRC connected state.

For example, in an application scenario, if the first SIM is in the RRC idle state or the RRC inactive state, the second SIM in the user equipment other than the first SIM is in the connected state, and the base station can send the short message to the user equipment through the second SIM.

Thus, in this example, if the first SIM to be paged is not the target SIM, and the second SIM is the target SIM, the base station can send the short message to the UE through the second SIM, so that when the first SIM is not in the RRC connected state, the short message can be received through the second SIM of the same UE, causing the UE to determine that the subsequent paging signaling is the paging signaling of the second SIM and/or the first SIM by analyzing the paging target indication of the short message. In this way, on the one hand, the processing complexity and power of the UE can be reduced; on the other hand, it can make the first SIM not at its own paging occasion, know in advance whose paging signaling the subsequent paging signaling is, and if it is its own paging signaling, it can also help the first SIM to quickly establish a connection with the base station.

As another example, in another application scenario, if the first SIM is in the RRC connected state, the base station can send the short message to the user equipment through the first SIM.

Thus, in this example, if the first SIM to be paged is the target SIM, the base station can send the short message to the UE through the first SIM, so that the UE can determine whether the subsequent paging signaling is the paging signaling for paging the first SIM by analyzing only the paging target indication of the short message. Thus, the processing complexity and power of the UE can be reduced.

In some embodiments, before step S21, the method further includes: determining whether to page the first SIM in the UE;

Step S21 includes: obtaining information of the first SIM in response to a need to page the first SIM in the UE.

In one embodiment, the information of the first SIM includes a card identification of the first SIM. Of course, in other embodiments, the information of the first SIM may also be other information used to uniquely identify the first SIM, such as a name of the first SIM.

Here, the card identification can uniquely identify the SIM in the UE. Here, the card identification may be a string of characters, in which the characters include but are not limited to one of the following: numbers and letters.

In embodiments of the present disclosure, by sending the short message carrying the paging target indication to the UE, the UE can know in advance whether the SIM to be paged is the target SIM or which SIM of the UE is the SIM to be paged according to the paging target indication. In this way, when the UE decodes the paging signaling, the number of card identification matching is reduced, thus reducing the decoding time and the delay.

In other embodiments, step S23 includes:
sending a short message carrying the paging target indication to the target SIM.

In an embodiment, sending the short message carrying the paging target indication to the target SIM includes:
sending the short message carrying the paging target indication to the target SIM through a physical downlink control channel (PDCCH);
or, sending the short message carrying the paging target indication to the target SIM through a PDCCH before a target paging occasion (PO) of the target SIM comes.

The target PO may be a next paging occasion or any paging occasion.

In one embodiment, sending the short message carrying the paging target indication to the target SIM through the physical downlink control channel, includes:
sending physical downlink control information (DCI) carrying the short message to the target SIM through the physical downlink control channel.

Here, the type of the short message is indicated by 2 bits in the DCI. For example, as shown in Table 1 below, when the two bits (bit field) of the DCI are set to "00", the short message indicator is configured to indicate that the type of the short message is: Reserved; when the two bits are set to "01", the short message indicator is configured to indicate that the type of the short message is: Only scheduling information for paging is present in the DCI; when the two bits are set to "10", the short message indicator is configured to indicate that the type of the short message is: Only short message is present in the DCI; when the two bits are set to "11", the short message indicator is configured to indicate that the type of the short message is: Both scheduling information for Paging and short message are present in the DCI.

TABLE 1

| bits | short message indicator |
|---|---|
| 00 | Reserved |
| 01 | Only scheduling information for paging is present in the DCI |
| 10 | Only short message is present in the DCI |
| 11 | Both scheduling information for Paging and short message are present in the DCI |

In one embodiment, the two bits configured to indicate the type of the short message may be any 2 bits in the DCI.

In an application scenario, by setting the two bits of the DCI to "11", the base station is instructed to send the short message and paging signaling to the target SIM. Of course, in other application scenarios, it is also possible to instruct the base station to send only the short messages to the target SIM by setting the two bits in the DCI to "10"; and so on.

In this way, through the identification carried by two bits, such as "10", "11", etc., the DCI can indicate whether the DCI sent by the base station contains the short message or the paging signaling, and whether the paging signaling will be issued subsequently if the short message is included. Thus, it can tell the UE how to send paging, so that the UE can establish connection with the base station through the corresponding paging mode.

In one embodiment, the short message may be scrambled with a Paging Radio Network Temporary Identity (P-RNTI). In this way, on the one hand, all the UEs of the same cell or multiple SIMs of the same UE can obtain the short message by decoding; on the other hand, the UE only needs to monitor the PDCCH after P-PRNTI scrambling, so that the UE can save power.

In some embodiments, the short message at least includes an identifier;

the identifier includes:

at least one indication bit as the paging target indication.

In one embodiment, the paging target indication includes at least an indicator; the indicator is configured to indicate that the target SIM receiving the paging target indication is paged.

In another embodiment, the paging target indication includes at least an indicator; the indicator is configured to indicate that a SIM other than the target SIM receiving the paging target indication is paged.

Here, in response to the target SIM receiving the paging target indication being the first SIM, and the indicator being configured to indicate that the target SIM is paged, then the indicator indicates that the first SIM is paged;

or, in response to the target SIM receiving the paging target indication being the second SIM, and the indicator being configured to indicate that a SIM other than the target SIM being paged, the indicator indicates that the first SIM other than the second SIM is paged.

As shown in Table 2 below, a format of the short message is disclosed. The short message has 8 bits in total. The first bit is system information modification (systemInfoModification). If it is set to "1", it indicates the update of the broadcast control channel (BCCH) except for SIB6, SIB7 and SIBS. The second bit is earthquake tsunami warning system and commercial mobile alarm service (etwsAndCmaIndication). If it is set to "1", it indicates a primary notification of an earthquake tsunami warning system, and/or a secondary notification of an earthquake tsunami system, and/or a non-notification of a commercial mobile alarm service. The third bit is the paging target indication. If it is set to "1", it indicates that the SIM to be paged is itself, and if it is set to "0", it indicates that the SIM to be paged is another SIM in the same UE. The fourth bit to the eighth bit are reserved.

TABLE 2 format of a short message

| bit field | short message function |
|---|---|
| 1 | system information modification<br>If it is set to "1", it indicates the update of the broadcast control channel (BCCH) except for SIB6, SIB7 and SIB8 |
| 2 | earthquake tsunami warning system and commercial mobile alarm service<br>If it is set to "1", it indicates a primary notification of an earthquake tsunami warning system, and/or a secondary notification of an earthquake tsunami system, and/or a non notification of a commercial mobile alarm service |
| 3 | paging target indication<br>If it is set to "1", it indicates that the SIM to be paged is itself, and if it is set to "0", it indicates that the SIM to be paged is another SIM in the same UE |
| 4-8 | Reserved |

In embodiments of the present disclosure, the identifier is the third bit of the short message. Of course, in other embodiments, the identifier may also be any bit of the short message, such as the first bit or the second bit, or any bit from the fourth bit to the eighth bit.

In this way, in this embodiment, the SIM to be paged is indicated by adding one bit to the short message, so that the target SIM will determine whether the subsequent paging signaling is the paging signaling for the target SIM itself according to the paging target indication indicated in the information indicator after receiving the short message, and thus can inform the UE of the object paged by the subsequent paging signaling in advance.

In some embodiments, the method further includes:

sending the paging signaling for the first SIM to the target SIM.

Here, the paging signaling may carry the information of the first SIM.

In one embodiment, the information of the first SIM includes a card identification of the first SIM.

In an application scenario, sending the paging signaling for the first SIM to the target SIM includes: if the target SIM is the first SIM, sending the paging signaling carrying the card identification to the first SIM at the paging occasion of the first SIM.

Thus, in this embodiment, if the first SIM to be paged is the target SIM, the first SIM is in the RRC connected state. The base station can directly send the paging signaling through the first SIM. Thus, the base station can quickly send the paging signaling for paging the first SIM through the first SIM at the current moment.

In another application scenario, sending the paging signaling for the first SIM to the target SIM includes: if the target SIM is the second SIM, sending the paging signaling carrying the card identification to the second SIM at the paging occasion of the second SIM.

Thus, in this embodiment, if the first SIM to be paged is not the target SIM, and the second SIM in the same UE as the first SIM is the target SIM, the second SIM is in the RRC connected state. The base station can send the paging signaling through the second SIM. Thus, the base station can quickly send the paging signaling for the first SIM through the second SIM at the current moment.

In embodiments of the present disclosure, the base station determines the card identification of the first SIM of the UE to be paged, and sends the paging target indication of the UE to the target SIM of the UE, wherein the target SIM is the first SIM or the second SIM, and wherein, the paging target indication is configured to indicate paging the first SIM. Thus, in embodiments of the present disclosure, when the base station pages the first SIM in the UE, it is unnecessary to wait for the paging occasion of the first SIM to be paged before issuing the paging target indication of the first SIM. At the current time, the paging target indication carrying indication of the first SIM can be sent to the target SIM, that is, the SIM connected with the base station at this time, to inform the UE which SIM the subsequent paging instruction will be sent to. In this way, the UE can know in advance which SIM the subsequent paging instruction is paging for, which is conducive to reducing the delay of UE using the SIM to establish a connection with the base station.

In addition, after the paging signaling is sent, the UE can quickly determine the first SIM to be paged, so as to improve the connection rate between the first SIM to be paged and the base station, and reduce the communication delay between the first SIM and the base station.

Of course, in other embodiments, the paging signaling sent to the target SIM may also include the paging signaling of the second SIM. At this time, the target SIM is the second SIM. In this way, if the paging target indication is configured to indicate that the SIM to be paged is the first SIM, the first SIM may be paged through the paging signaling; if the paging target indication is configured to indicate that the SIM to be paged is the second SIM, the second SIM may be paged through the paging signaling.

In some embodiments, sending the short message carrying the paging target indication to the target SIM at the current time, includes:

in response to the target PO being not the PO of the first SIM, sending the short message carrying the paging target indication to the target SIM.

In embodiments of the disclosure, the target PO may be the next PO or any PO.

In embodiments of the disclosure, if the target PO is not the PO of the first SIM, the target SIM is the second SIM other than the first SIM in the UE.

Here, the paging occasions of different SIMs in the user equipment are the same or different. In some embodiments, for example, the user equipment includes a first SIM and a second SIM, the paging occasion of the first SIM is different from that of the second SIM, and the paging occasion of the first SIM is later than that of the second SIM.

In this way, in embodiments of the disclosure, if the target PO is not the paging occasion of the first SIM, the short message can be sent to the target SIM (such as the second SIM). Thus, when it is not at the paging occasion of the first SIM for paging, it is also possible to receive the short message through other SIMs in the UE, such as the target SIM (such as the second SIM), and receive the paging signaling for paging the first SIM based on other SIMs (such as the second SIM). Thus, the base station can page to the first SIM to be paged in advance, speeding up the connection between the first SIM and the base station.

In some embodiments, the method further includes:

in response to the target PO being the PO of the first SIM, sending a paging instruction for paging the first SIM to the first SIM.

In embodiments of the disclosure, the target PO may be the next PO or any PO.

In this way, in embodiments of the present disclosure, if the target PO is the PO of the first SIM, the UE can also use the first SIM to establish a communication connection with the base station by sending a paging signaling to the first SIM. Thus, the communication connection with the base station can also be quickly established at the paging occasion of the first SIM.

Figure 3:
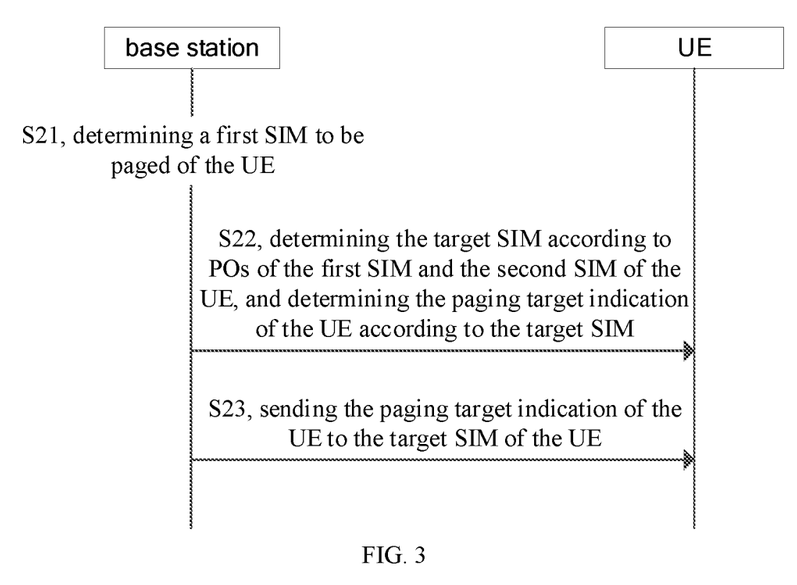
FIG. 3 is a flowchart of an information processing method applied to a base station according to an exemplary embodiment.

As shown in FIG. 3, in some embodiments, the method further includes:

step S22, determining the target SIM according to the paging occasions (POs) of the first SIM and the second SIM of the UE, and determining the paging target indication of the UE according to the target SIM.

Here, determining the target SIM according to the POs of the first SIM and the second SIM of the UE, includes:

determining the target SIM according to time differences between the POs of the first SIM and the second SIM of the UE and the current time.

In embodiments of the present disclosure, the target SIM can be determined, so that the base station can send the short message based on the target SIM.

Moreover, in embodiments of the disclosure, the target SIM may also be determined based on the POs of a plurality of SIMs, namely the first SIM and the second SIM. For example, whether the target SIM is the first SIM or the second SIM is determined according to the time differences between the POs of the first SIM and the second SIM and the current time. In this way, the SIM with the minimum time difference between the paging occasion and the current time can be determined as the target SIM based on the time differences, so that the first SIM can be paged as soon as possible.

In some embodiments, determining the target SIM according to the POs of the first SIM and the second SIM of the UE, includes:

in response to the target PO being the PO of the second SIM, determining that the second SIM is the target SIM, in which the target PO is the next PO of the UE;

or, in response to the target PO being the PO of the first SIM, determining that the second SIM is the target SIM.

Here, the PO of the UE includes the PO of the first SIM and/or the PO of the second SIM.

In embodiments of the disclosure, the target SIM receiving the paging target indication may be determined according to the next PO of the UE, so that the paging target indication can be obtained as soon as possible, and further the UE can know which SIM is paged by the subsequent paging signaling as soon as possible.

In other embodiments, determining the target SIM according to the POs of the first SIM and the second SIM of the UE, includes:

in response to the time interval with the next PO of the first SIM being less than or equal to the time interval with the next PO of the second SIM, determining that the first SIM is the target SIM;

or, in response to the time interval with the next PO of the first SIM being greater than or equal to the time interval with the next PO of the second SIM, determining that the second SIM is the target SIM.

In embodiments of the present disclosure, the SIM corresponding to the minimum time difference is taken as the target SIM according to the time difference between the current time and the target PO (such as the next PO) of the first SIM and the time difference between the current time and the target PO (such as the next PO) of the second SIM. Thus, in embodiments of the present disclosure, it is always possible to send the paging target indication to the UE through the target SIM corresponding to an earlier PO, so that the UE can know in advance whether the subsequent paging instruction is the paging signaling for the first SIM, and if so, the delay of establishing the communication connection with the base station using the first SIM is further reduced.

In some embodiments, determining the target SIM according to the POs of the first SIM and the second SIM of the UE, includes:

in response to the time difference with the target PO of the first SIM being less than or equal to the time difference with the PO of the second SIM, determining that the target SIM is the first SIM;

or,

In response to the time difference with the target PO of the first SIM being greater than or equal to the time difference with the target PO of the second SIM, determining that the target SIM is the second SIM.

In some embodiments, the target PO is the next PO of the UE, or any PO of the UE.

In embodiments of the present disclosure, if the time difference between the target PO of the first SIM and the current time is less than or equal to the time difference between the target PO of the second SIM and the current time, in this case, the target PO of the first SIM is earlier than the target PO of the second SIM, and the target SIM is determined to be the first SIM.

Or, if the time difference between the target PO of the first SIM and the current time is greater than or equal to the time difference between the PO of the second SIM and the current time, in this case, the target PO of the second SIM is earlier than the target PO of the second SIM, and the target SIM is determined to be the second SIM.

Thus, in embodiments of the disclosure, the PO of the target SIM determined is always the earlier one of target POs of multiple SIMs in the UE. In this way, if the current time is not the PO of the first SIM, the UE can always send the short message to the UE through the target SIM corresponding to the earlier PO, so that the UE can know in advance whether the subsequent paging signaling is the paging signaling for the first SIM based on the received short message, and if is for the first SIM, the first SIM is paged by the base station in advance.

In one embodiment, determining the target SIM according to the POs of the first SIM and the second SIM of the UE, includes:
in response to the time difference between the target PO of the first SIM and the current time being the same as the time difference between the PO of the second SIM and the current time, selecting the first SIM or the second SIM as the target SIM.

Thus, in embodiments of the present disclosure, if the time difference between the PO of the first SIM and the current time is the same as the time difference between the PO of the second SIM and the current time, one of the first SIM and the second SIM can be arbitrarily selected as the target SIM, and receiving the paging signaling based on the target SIM can realize fast paging to the first SIM.

In another embodiment, determining the target SIM according to the POs of the first SIM and the second SIM of the UE, includes:
in response to the time difference between the PO of the first SIM and the current time being the same as the time difference between the PO of the second SIM and the current time, selecting the first SIM as the target SIM.

Thus, in embodiments of the disclosure, if the time difference between the PO of the first SIM and the current time is the same as the time difference between the PO of the second SIM and the current time, and if the first SIM is used as the target SIM, the information interaction between SIMs in the UE is reduced, and the delay can be further reduced.

It should be pointed out here that the following information processing method is applied to a user equipment and is similar to the description of the above information processing method applied to the base station. For the technical details not disclosed in the embodiments of the information processing method applied to the user equipment in the present disclosure, please refer to the description of the embodiments of the information processing method applied to the base station in the present disclosure, which will not be described in detail here.

Figure 4:
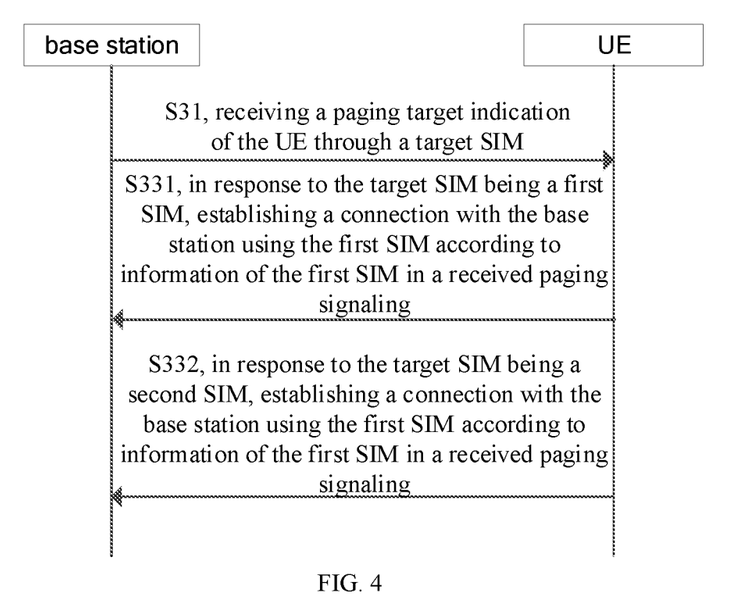
FIG. 4 is a flowchart of an information processing method applied to a user equipment according to an exemplary embodiment.

As shown in FIG. 4, this embodiment of the present disclosure provides an information processing method applied to a user equipment. The method includes the following steps.

In step S31, a paging target indication of the UE is received through a target SIM.

The target SIM is a first SIM or a second SIM, and the paging target indication is configured to indicate paging the first SIM.

Here, the UE at least includes the first SIM and the second SIM. There may be one or more first SIM and one or more second SIM. Here, the UE at least includes the target SIM.

Here, the target SIM is preset with the card identifications of all SIMs in the UE. In this way, when the target SIM receives the paging signaling, the card identification of the SIM to be paged indicated in the paging target indication is matched with the card identification carried in the paging signaling.

In an embodiment, the paging target indication may be configured to indicate the SIM to be paged, in addition to indicating whether the SIM to be paged is the target SIM itself.

Here, the paging target indication being configured to indicate the SIM to be paged refers to indicating which SIM of the UE is the SIM to be paged. Here, the paging target indication may be determined based on the number of SIMs in the UE and the number indicated by the indication bit.

In an application scenario, if there are N SIMs in the UE, the card identifications of the N SIMs may be preset as 1, 2, . . . N respectively. According to the number indicated by the indicator bit, the SIM corresponding to the number can be determined. For example, if the value indicated by the indication bit is 3, it can be determined that the SIM to be paged is the SIM corresponding to the card identification of 3 in the UE.

Thus, in this embodiment, it is possible to determine which SIM is paged according to the paging target indication. In this way, it is only necessary to match the card identification of the SIM being paged, thus further simplifying the decoding of paging signaling and further reducing the delay in establishing the communication connection.

In an embodiment, step S31 includes:
receiving the short message based on the target SIM, the short message at least including the paging target indication.

In embodiments of the present disclosure, if the short message is received, it can be determined whether the SIM to be paged is the target SIM receiving the short message based on the paging target indication carried in the short message, and the first SIM to be paged is determined based on the card identification carried in the subsequent received paging signaling. In this way, the embodiment of the present disclosure can enable the first SIM to be paged in the UE not to wait for its own paging occasion to receive the paging signaling, but to receive the paging signaling in advance, which is conducive to reducing the time delay of the communication connection between the first SIM to be paged and the base station.

In some embodiments, the method further includes:
receiving the paging signaling; and
determining the first SIM being paged based on the paging signaling.

In some embodiments, receiving the paging signaling includes:
receiving the paging signaling based on the target SIM.

In an embodiment, determining the first SIM being paged based on the paging signaling includes:
in response to determining that the SIM to be paged is not the target SIM receiving the short message, determining the first SIM being paged according to the card identification carried in the paging signaling. In this case, the SIM to be paged is the first SIM, and the target SIM is the second SIM.

Thus, in embodiments of the present disclosure, the SIM to be paged is not the target SIM receiving the short message, then the target SIM is the second SIM. Thus, the paging signaling for the first SIM can be received based on the second SIM.

In another embodiment, determining the first SIM being paged based on the paging signaling includes:

in response to determining that the SIM to be paged is the target SIM receiving the short message, determining the first SIM to be paged according to the card identification carried by the paging signaling. At this time, the SIM to be paged is the first SIM, and the target SIM is also the first SIM.

In this way, in embodiments of the present disclosure, the SIM to be paged is the target SIM receiving the short message, and the target SIM is the first SIM. In this way, the paging instruction about the first SIM can be received based on the first SIM itself.

Of course, in other embodiments, if the first SIM to be paged is the target SIM receiving the short message, it is also possible to receive the paging signaling directly through the target SIM instead of receiving the short message through the target SIM.

In some embodiments, the short message further includes an identifier;
the identifier includes:
at least one indication bit used for the paging target indication.

In an embodiment, the paging target indication at least includes an identifier, which is configured to indicate that the target SIM receiving the paging target indication is paged.

In another embodiment, the paging target indication at least includes an identifier, which is configured to indicate that a SIM other than the target SIM receiving the paging target indication is paged.

In some application scenarios, the method further includes: determining whether the SIM to be paged is the target SIM receiving the short message according to the paging target indication. For example, when the bit value of the paging target indication is the first value, it is determined that the SIM to be paged is the target SIM; or, when the bit value of the paging target indication is set as the second value, it is determined that the SIM to be paged is a SIM other than the target SIM in the same UE as the target SIM.

In an embodiment, the first value is "1" and the second value is "0".

Of course, in other embodiments, the first value and the second value may also be other values, for example, the first value is "0" and the second value is "1", which are not limited here. It only needs to satisfy that the SIM to be paged indicated by the first value is different from the SIM to be paged indicated by the second value.

In embodiments of the present disclosure, by defining an indication bit in the short message, the paging target indication can be added to the indication bit to indicate whether the object to be paged is the target SIM.

In some embodiments, the paging target indication is determined according to the target SIM of the UE;
the target SIM is determined according to the paging occasions (Pos) of the first SIM and the second SIM of the UE.

In some embodiments, determining the target SIM according to the POs of the first SIM and the second SIM of the UE, includes:

in response to the target PO being the PO of the second SIM, determining the second SIM as the target SIM, in which the target PO is the next PO of the UE;
or,
in response to the target PO being the PO of the first SIM, determining the second SIM as the target SIM.

In other embodiments, determining the target SIM according to the POs of the first SIM and the second SIM of the UE, includes:

in response to the time interval with the next PO of the first SIM being less than or equal to the time interval with the next PO of the second SIM, determining that the first SIM is the target SIM;
or,
in response to the time interval with the next PO of the first SIM being greater than or equal to the time interval with the next PO of the second SIM, determining that the second SIM is the target SIM.

Please refer to FIG. 4 again, in some embodiments, the method further includes:

step S331, in response to the target SIM being the first SIM, establishing a connection with the base station using the first SIM according to information of the first SIM included in the received paging signaling.

In embodiments of the present disclosure, if the target SIM is the first SIM, the paging signaling can be received based on the PO of the first SIM, and further a communication connection with the base station can be established quickly.

Please refer to FIG. 4 again, in other embodiments, the method further includes:

step S332, in response to the target SIM being the second SIM, establishing a connection with the base station using the first SIM according to information of the first SIM included in the received paging signaling.

In an embodiment, the information of the first SIM includes the card identification of the first SIM.

In embodiments of the present disclosure, if the target SIM is the second SIM, the paging signaling can be received based on the PO of the second SIM in the same UE as the first SIM, and further a communication connection with the base station can be established quickly.

In order to help understand the above embodiments of the present disclosure, the following examples are described as examples.

Figure 5:
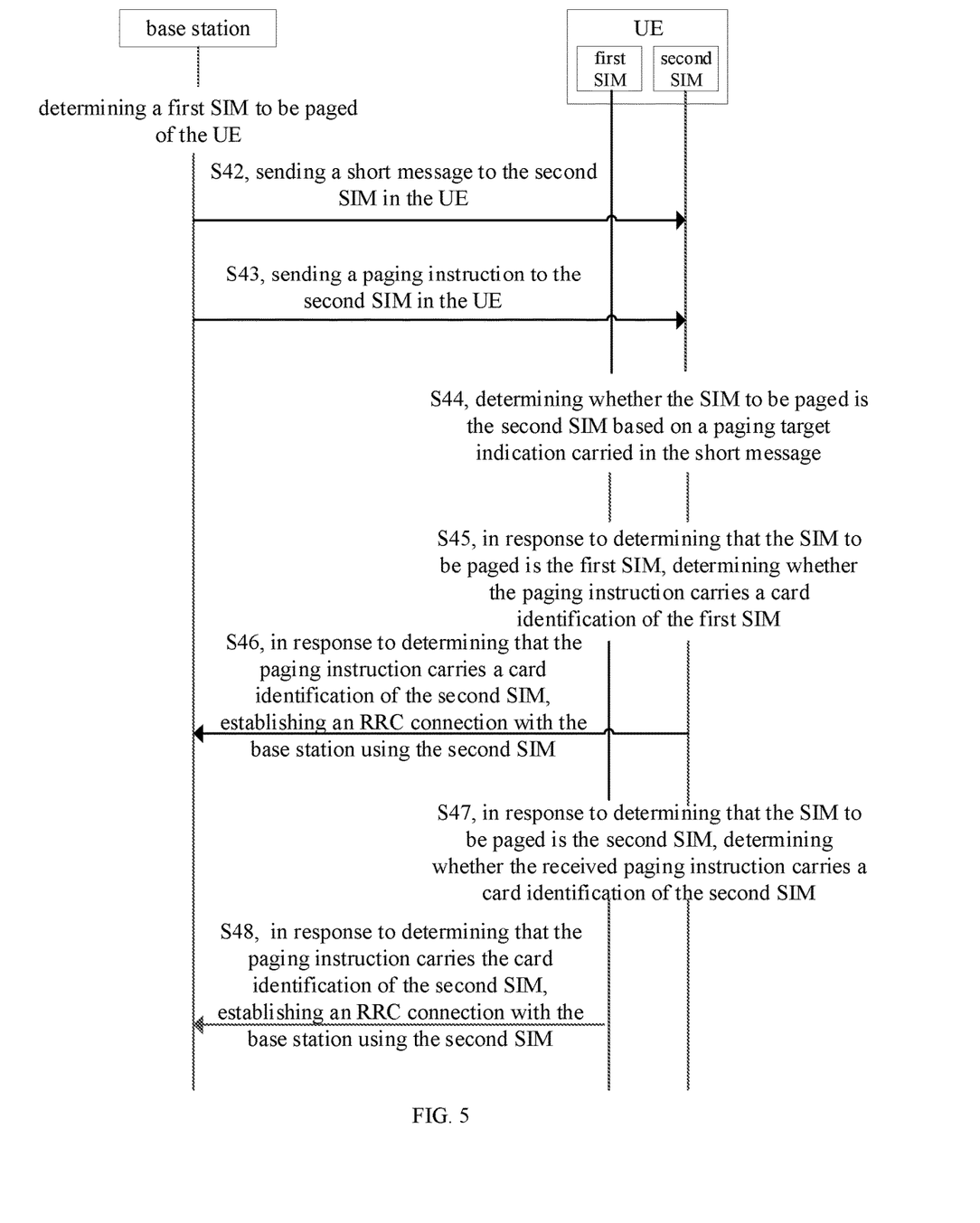
FIG. 5 is a flowchart of an information processing method applies to an information processing system according to an exemplary embodiment.

As shown in FIG. 5, an information processing method is provided. The method is applied to an information processing system, which includes: a user equipment (UE) and a base station. The user equipment includes a first SIM and a second SIM. The method includes the following steps.

In step S41, the first SIM of the UE to be paged is determined.

In one embodiment, the base station determines that the SIM to be paged in the UE is the first SIM, and obtains the card identification of the first SIM.

Of course, in other embodiments, step S41 may also be to obtain the information of the first SIM of the UE to be paged, in which the information of the first SIM may also be used to uniquely identify the first SIM.

In an optional embodiment, the base station also determines the card identification of the second SIM in the UE.

In step S42, a short message is sent to the second SIM in the UE.

In an embodiment, the base station sends a short message to the second SIM in the UE, wherein the short message carries the paging target indication, and the paging target indication is configured to indicate whether the SIM to be paged is the second SIM.

In step S43, a paging instruction is sent to the second SIM in the UE.

In an embodiment, the base station sends the paging instruction to the second SIM in the UE at the paging occasion of the second SIM.

Here, the paging instruction carries the card identification of the SIM. Here, the SIM includes the first SIM or the second SIM.

In step S44, whether the SIM to be paged is the second SIM is determined based on the paging target indication carried in the received short message.

In an embodiment, the UE receives the short message based on the second SIM, and determines whether the SIM to be paged is the second SIM based on the paging target indication carried in the short message.

In step S45, in response to determining that the SIM being paged is the first SIM, it is determined whether the card identification of the first SIM is carried in the received paging instruction.

In one embodiment, the UE determines that the SIM to be paged is the first SIM based on the paging target indication, that is, determines whether the received paging instruction carries the card identification of the first SIM.

In step S46, in response to determining that the received paging instruction carries the card identification of the second SIM, an RRC connection with the base station is established using the second SIM.

In an embodiment, if the UE determines that the paging instruction carries the card identification of the first SIM, it determines that the first SIM is paged; the user equipment sends the paging signaling to the first SIM based on the second SIM; the first SIM of the user equipment receives the paging signaling and establishes an RRC connection with the base station.

In embodiments of the present disclosure, if it is determined that the SIM to be paged is the first SIM, a short message can be sent to the UE at the current time based on the second SIM in the UE, so that the UE knows whether the paging instruction sent subsequently is a paging instruction for paging the first SIM, and if yes, the UE can obtain the paging instruction for the first SIM based on the paging instruction for the second SIM, and does not need to wait for the paging occasion of the first SIM to receive the paging instruction, reducing the delay of establishing communication connection between the first SIM and the base station. Moreover, the UE knows in advance that the SIM being paged is the first SIM. In this way, when the UE decodes the paging signaling, it only needs to match the identification of the first SIM, thus reducing the number of matching card identifications, thus reducing the time required for decoding, and thus reducing the delay.

Please refer to FIG. 5 again, in some embodiments, the method further includes following steps.

In step S47, in response to determining that the SIM to be paged is the second SIM, it is determined whether the received paging instruction carries the card identification of the second SIM.

In an embodiment, the user equipment determines that the SIM to be paged is the second SIM based on the paging target indication, then it is determined whether the received paging instruction carries the card identification of the second SIM.

In step S48, in response to determining that the received paging instruction carries the card identification of the second SIM, an RRC connection with the base station is established using the second SIM.

In an embodiment, if the user equipment determines that the card identification of the second SIM is carried in the paging instruction, it determines that the second SIM is paged, and the user equipment establishes RRC connection with the base station based on the second SIM.

In this way, in embodiments of the present disclosure, if the object to be paged indicated in the target paging indication in the short message sent to the second SIM is not the first SIM, the paging signaling of the second SIM can also be obtained based on the second SIM, and therefore, the communication connection with the base station can be continuously established based on the second SIM.

Of course, in some embodiments, the method may further include:

sending the paging instruction carrying the first SIM to the first SIM at the paging occasion of the first SIM. In this way, the UE can also establish a communication connection with the base station by receiving the paging signaling of the first SIM at the paging occasion of the first SIM itself.

Figure 6:
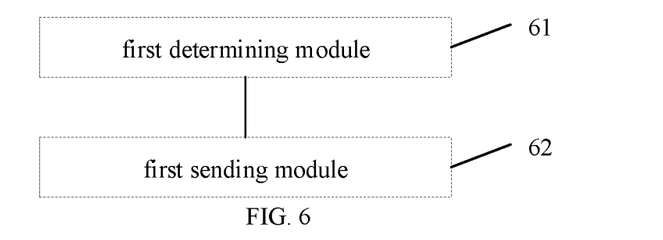
FIG. 6 is a block diagram of an information processing apparatus applied to a base station according to an exemplary embodiment.

As shown in FIG. 6, this embodiment provides an information processing apparatus applied to a base station. The apparatus incudes a first determining module 61 and a first sending module 62.

The first determining module 61 is configured to determine a first Subscriber Identity Module (SIM) of a user equipment (UE) to be paged, wherein the UE is at least configured with the first SIM and a second SIM.

The first sending module 62 is configured to send a paging target indication of the UE to a target SIM of the UE, wherein the target SIM is the first SIM or the second SIM, and wherein, the paging target indication is configured to indicate paging the first SIM.

In some embodiments, the first sending module 62 is configured to send the paging target indication to the target SIM of the UE through a short message.

In some embodiments, the paging target indication at least includes an identifier configured to indicate that the target SIM receiving the paging target indication is paged.

In some embodiments, the paging target indication at least includes an identifier configured to indicate that a SIM other than the target SIM receiving the paging target indication is paged.

In some embodiments, the first determining module 61 is configured to determine the target SIM according to paging occasions (POs) of the first SIM and the second SIM of the UE;
    determine the paging target indication of the UE according to the target SIM.

In some embodiments, the first determining module 61 is configured to determine that the second SIM is the target SIM in response to the PO of the second SIM being a target PO;
    or,
    determine that the second SIM is the target SIM in response to the PO of the first SIM being the target PO.

In some embodiments, the target PO is a next PO of the UE, or any PO of the UE.

In some embodiments, the first determining module is configured to determine that the first SIM is the target SIM in response to a time interval with a next PO of the first SIM is less than or equal to a time interval with a next PO of the second SIM;
    or,
    determine that the second SIM is the target SIM in response to the time interval with the next PO of the first SIM is greater than or equal to the time interval with the next PO of the second SIM.

Figure 7:
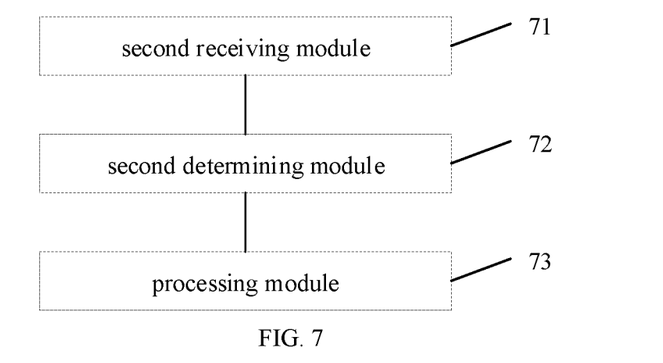
FIG. 7 is a block diagram of an information processing apparatus applied to a user equipment according to an exemplary embodiment.

As shown in FIG. 7, an information processing apparatus is applied to a user equipment. The apparatus includes a second receiving module 71.

The second receiving module 71 is configured to receive a paging target indication of the UE through a target SIM, wherein the target SIM is a first SIM or a second SIM, and wherein, the paging target indication is configured to indicate paging the first SIM.

In some embodiments, the second receiving module 71 is configured to receive a short message through the target SIM, wherein the short message at least includes the paging target indication.

In some embodiments, the paging target indication at least includes an identifier configured to indicate that the target SIM receiving the paging target indication is paged.

In some embodiments, the paging target indication at least includes an identifier configured to indicate that a SIM other than the target SIM receiving the paging target indication is paged.

In some embodiments, the paging target indication is determined according to the target SIM of the UE;
the target SIM is determined according to paging occasions (Pos) of the first SIM and the second SIM of the UE.

In some embodiments, the apparatus further includes a second determining module 72.

The second determining module 72 is configured to determine that the second SIM is the target SIM in response to the target PO being the PO of the second SIM;
or,
determine that the second SIM is the target SIM in response to the target PO being the PO of the first SIM.

In some embodiments, the second determining module is configured to determine that the first SIM is the target SIM in response to a time interval with a next PO of the first SIM being less than or equal to a time interval with a next PO of the second SIM;
or,
determine that the second SIM is the target SIM in response to a time interval with a next PO of the first SIM being greater than or equal to a time interval with a next PO of the second SIM.

In some embodiments, the target PO is the next PO of the UE, or any PO of the UE.

In some embodiments, the apparatus further includes a processing module 73.

The processing module 73 is configured to establish a connection with the base station using the first SIM according to information of the first SIM in a received paging signaling, in response to the target SIM being the first SIM.

In some embodiments, the processing module 73 is configured to establish a connection with the base station using the first SIM according to information of the first SIM in a received paging signaling, in response to the target SIM being the second SIM.

With respect to the apparatus in the above embodiments, the specific mode for each module to perform operation has been described in detail in the embodiments of the method, and will not be described in detail here.

Embodiments of the present disclosure provide a communication device. The communication device includes:
a processor; and
a memory, configured to store instructions executable by the processor,
wherein the processor is configured to implement the information processing method described in any embodiment of the present disclosure when running the executable instructions.

Here, the communication device includes a base station or a user equipment.

The processor may include various types of storage media, which are non-temporary computer storage media and can continue to store information on the communication device after the communication device is powered down. Here, the communication device includes a base station or a user equipment.

The processor may be connected to the memory via a bus or the like for reading executable programs stored on the memory, for example, at least one of the methods shown in FIGS. 2 to 5.

Embodiments of the present disclosure also provide a computer storage medium, wherein the computer storage medium stores a computer executable program, and when the executable program is executed by a processor, the information processing method described in any embodiment of the present disclosure is implemented, for example, at least one of the methods shown in FIGS. 2 to 5.

With respect to the apparatus in the above embodiments, the specific mode for each module to perform operations has been described in detail in the embodiments of the method, and will not be described in detail here.

Figure 8:
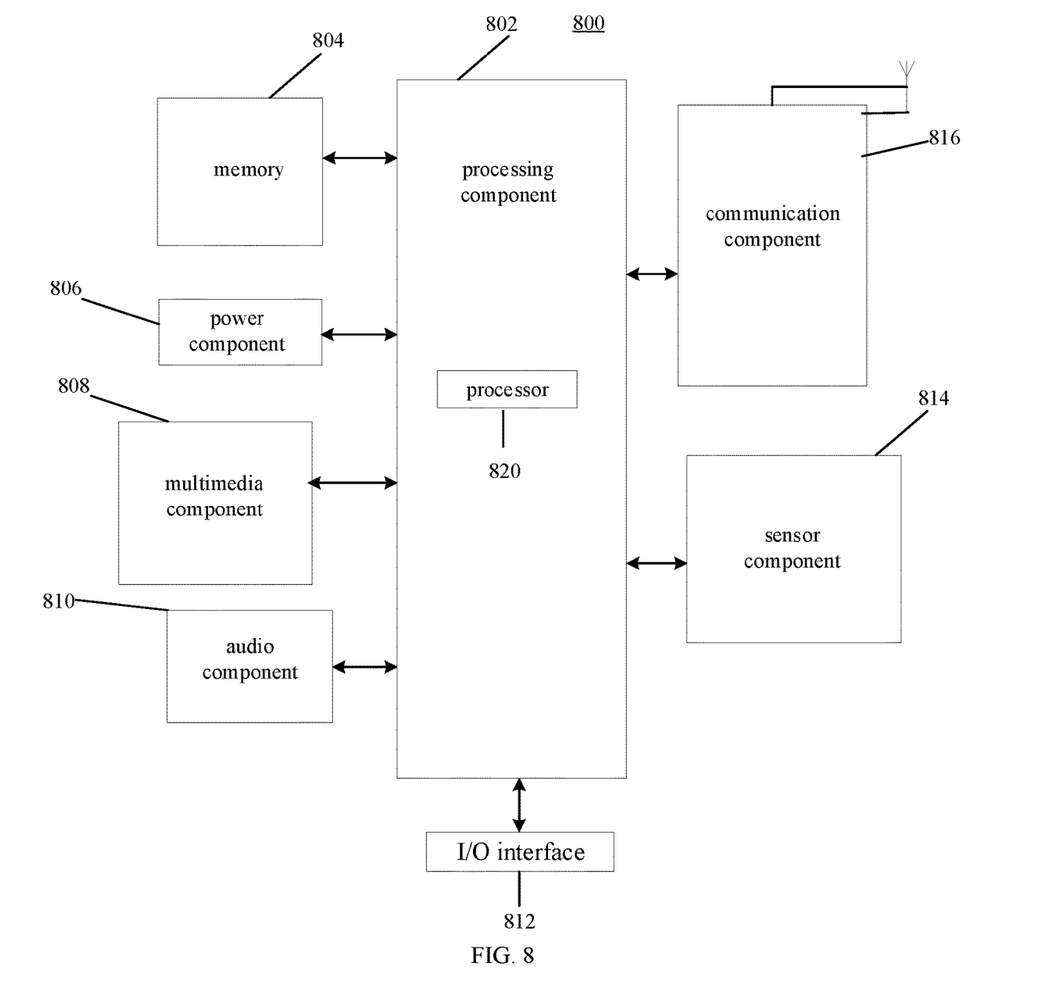
FIG. 8 is a block diagram of a user equipment according to an exemplary embodiment.

FIG. 8 is a block diagram of a user equipment 3000 according to an exemplary embodiment. For example, the user equipment 800 may be a mobile phone, a computer, a digital broadcast terminal, a messaging device, a gaming console, a tablet, a medical device, exercise equipment, a personal digital assistant, and the like.

Referring to FIG. 8, the user equipment 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the user equipment 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the user equipment 800. Examples of such data include instructions for any disclosures or methods operated on the user equipment 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the user equipment 800. The power component 806 may include a power management system, one or more power sources, and any other components associated with the generation, management, and distribution of power in the user equipment 800.

The multimedia component 808 includes a screen providing an output interface between the user equipment 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the user equipment 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the user equipment 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the user equipment 800. For instance, the sensor component 814 may detect an open/closed status of the user equipment 800, relative positioning of components, e.g., the display and the keypad, of the user equipment 800, a change in position of the user equipment 800 or a component of the user equipment 800, a presence or absence of user contact with the user equipment 800, an orientation or an acceleration/deceleration of the user equipment 800, and a change in temperature of the user equipment 800. The sensor component 814 may include a proximity sensor configured to detect the presence of nearby objects without any physical contact. The sensor component 814 may also include a light sensor, such as a CMOS or CCD image sensor, for use in imaging disclosures. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the user equipment 800 and other devices. The user equipment 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the user equipment 800 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the user equipment 800, for performing the above-described methods. For example, the non-transitory computer-readable storage medium may be a ROM, a RAM, a CD-ROM, a magnetic tape, a floppy disc, an optical data storage device, and the like.

An embodiment of the present disclosure provides an information processing method applied to a base station. The method includes the following step:

sending a paging target indication to a UE, in which the paging target indication at least includes an identifier, which is used to indicate that the target SIM receiving the paging target indication is paged, or a SIM other than the target SIM receiving the paging target indication is paged.

An embodiment of the present disclosure provides an information processing method applied to a user equipment (UE). The method includes the following step:

receiving a paging target indication, in which the paging target indication at least includes an identifier, which is used to indicate that the target SIM of the UE receiving the paging target indication is paged, or that the SIM of the UE other than the target SIM receiving the paging target indication is paged.

Figure 9:
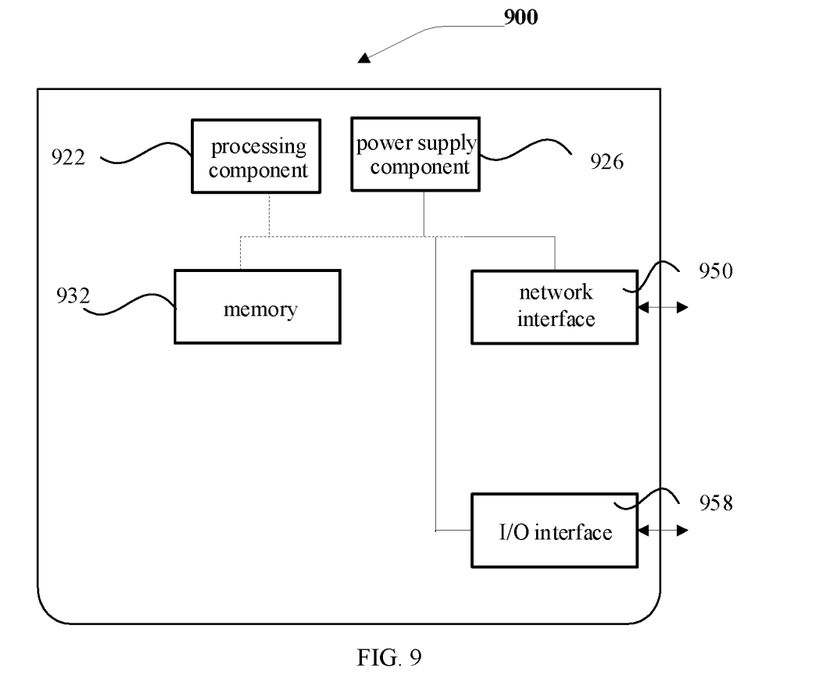
FIG. 9 is a block diagram of a base station according to an exemplary embodiment.

As shown in FIG. 9, an embodiment of the present disclosure shows a block diagram of a base station. For example, the base station 900 may be provided as a network side device. Referring to FIG. 9, the base station 900 includes a processing component 922, which further includes one or more processors, and a memory resource represented by a memory 932 for storing instructions, such as application programs, that can be executed by the processing component 922. Application programs stored in the memory 932 may include one or more modules each corresponding to a set of instructions. In addition, the processing component 922 is configured to execute instructions to perform any method of the above described methods applied to the base station, for example, the method shown in FIGS. 2-3.

The base station 900 may also include a power supply component 926 configured to perform power management of the base station 900, a wired or wireless network interface 950 configured to connect the base station 900 to the network, and an input/output (I/O) interface 958. The base station 900 can operate an operating system based on the memory 932, such as Windows Server™, Mac OS X™, Unix™, Linux™ FreeBSD™ or similar.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art.

It will be appreciated that the present disclosure is not limited to the exact construction that has been described above and illustrated in the accompanying drawings, and that various modifications and changes can be made without departing from the scope thereof.

What is claimed is:

1. An information processing method, comprising:
   determining, by a base station, a first Subscriber Identity Module (SIM) of a user equipment (UE) to be paged, wherein the UE is at least configured with the first SIM and a second SIM;
   determining, by the base station, a target SIM according to paging occasions (POs) of the first SIM and the second SIM of the UE; wherein the target SIM is the first SIM or the second SIM and the target SIM is a SIM connected to the base station;
   determining, by the base station, a paging target indication of the UE according to the target SIM; wherein the paging target indication is configured to indicate paging the first SIM;
   determining, by the base station, a physical downlink control information, DCI, carrying a short message, wherein the short message carrying the paging target indication;
   sending, by the base station, the paging target indication to the target SIM of the UE through the short message contained in the DCI.

2. The method of claim 1, wherein the paging target indication at least comprises an identifier configured to indicate that the target SIM receiving the paging target indication is paged.

3. The method of claim 1, wherein the paging target indication at least comprises an identifier configured to indicate that a SIM other than the target SIM receiving the paging target indication is paged.

4. The method of claim 1, wherein determining the target SIM according to the POs of the first SIM and the second SIM of the UE, comprises at least one of the following:
   determining that the second SIM is the target SIM in response to the PO of the second SIM being a target PO;
   determining that the first SIM is the target SIM in response to the PO of the first SIM being the target PO.

5. The method of claim 4, wherein the target PO is a next PO or any PO.

6. The method of claim 1, wherein determining the target SIM according to the POs of the first SIM and the second SIM of the UE, comprises at least one of the following:
   determining that the first SIM is the target SIM in response to a time interval with a next PO of the first SIM is less than or equal to a time interval with a next PO of the second SIM;
   determining that the second SIM is the target SIM in response to the time interval with the next PO of the first SIM is greater than or equal to the time interval with the next PO of the second SIM.

7. A base station, comprising:
   a processor; and
   a memory, configured to store instructions executable by the processor,
   wherein the processor is configured to implement the method of claim 1 by executing the instructions stored in the memory.

* * * * *